(12) United States Patent
Cunningham et al.

(10) Patent No.: US 7,945,252 B2
(45) Date of Patent: *May 17, 2011

(54) CUSTOMER SERVICE MESSAGING, SUCH AS ON MOBILE DEVICES

(75) Inventors: Ivy Cunningham, Seattle, WA (US); Stacia Lynn Pache, Redmond, WA (US); Christopher White, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 295 days.

This patent is subject to a terminal disclaimer.

(21) Appl. No.: 12/056,948

(22) Filed: Mar. 27, 2008

(65) Prior Publication Data

US 2008/0176541 A1 Jul. 24, 2008

Related U.S. Application Data

(63) Continuation of application No. 11/092,199, filed on Mar. 28, 2005, now Pat. No. 7,356,345.

(60) Provisional application No. 60/588,110, filed on Jul. 15, 2004.

(51) Int. Cl.
*H04M 3/42* (2006.01)
*H04M 1/725* (2006.01)
*H04M 1/66* (2006.01)

(52) U.S. Cl. ............... 455/414.1; 455/466; 455/412.1; 455/411

(58) Field of Classification Search ............ 455/412, 455/414, 414.1, 411, 406, 564, 558; 379/58, 379/114.05, 114.2; 725/50; 709/207, 226, 709/104; 715/733; 705/26
See application file for complete search history.

(56) References Cited

U.S. PATENT DOCUMENTS

| | | | |
|---|---|---|---|
| 5,966,652 A | 10/1999 | Coad et al. | |
| 6,167,255 A | 12/2000 | Kennedy, III et al. | |
| 6,226,364 B1 | 5/2001 | O'Neil | |
| 6,650,887 B2 | 11/2003 | McGregor et al. | |
| 7,356,345 B2 * | 4/2008 | Cunningham et al. | 455/466 |
| 7,464,092 B2 * | 12/2008 | Lee et al. | 1/1 |
| 2002/0098874 A1 | 7/2002 | Zirul et al. | |
| 2002/0165024 A1 | 11/2002 | Puskala | |
| 2003/0195811 A1 | 10/2003 | Hayes et al. | |

OTHER PUBLICATIONS

U.S. Appl. No. 10/918,617, filed Aug. 13, 2004, Fang.
U.S. Appl. No. 60/585,965, filed Jul. 7, 2004, Cunningham.
U.S. Appl. No. 60/588,307, filed Jul. 15, 2004, Cunningham.
U.S. Appl. No. 60/590,185, filed Jul. 21, 2004, Cunningham.
U.S. Appl. No. 60/587,792, filed Jul. 12, 2004, White.
U.S. Appl. No. 60/588,018, filed Jul. 12, 2004, White.
U.S. Appl. No. 60/590,229, filed Jul. 21, 2004, Dahan.

* cited by examiner

*Primary Examiner* — Charles N Appiah
*Assistant Examiner* — Kiet Doan
(74) *Attorney, Agent, or Firm* — Woodcock Washburn LLP

(57) ABSTRACT

A mobile device and corresponding service provider are configured to provide a user of the mobile device with access to one or more instant messaging help entities, from the mobile device. The one or more instant messaging help entities may be associated with the corresponding service provider or with a service that is external to the corresponding service provider. In some cases, some of the one or more instant messaging help entities may be embedded as part of the mobile device or service, so that access to the one or more help entities may not be permanently terminated by the user. In some cases, the user may control access to some of the one or more instant messaging help entities, such as by adding or removing the access to the instant messaging help entities from a list of instant messaging entities.

21 Claims, 9 Drawing Sheets

CUSTOMER SERVICE MESSAGING, SUCH AS ON MOBILE DEVICES

CROSS-REFERENCE TO RELATED APPLICATION

This application is a continuation application and claims priority to U.S. patent application. Ser. No. 11/092,199, now U.S. Pat. No. 7,356,345, filed Mar. 28, 2005, which claims priority to U.S. Provisional Application No. 60/588,110, filed Jul. 15, 2004, both of which are herein incorporated by reference.

This application is related by subject matter to the subject matter disclosed in the following commonly assigned applications, the entirety of which are hereby incorporated by reference herein: U.S. patent application Ser. No. 12/057,025 and U.S. patent application Ser. No. 12/057,065, each filed on Mar. 27, 2008 and each entitled "Customer Service Messaging, Such as on Mobile Devices."

BACKGROUND

Mobile device users may have a range of customer service needs. Some of these customer service needs may be related to the mobile device itself. For example, mobile device users may need help with device activation, technical questions, wireless service plan features, wireless service plan updates, billing questions, etc. Mobile device users may also have customer service and other needs that are not directly associated with their wireless service device (e.g., banking, emergency medical assistance, roadside assistance, etc.).

Many service providers offer telephone help lines and similar customer service features that users may access via a telephone. In addition, some Internet web sites offer customer service help via customer chat rooms or the like. While some mobile devices may have access to Internet sites including those providing customer assistance via chat rooms or the like, accessing such customer service web sites may be difficult from a mobile device, due to the compact nature of the devices themselves. Instead, customers often resort to calling customer help lines and other voice-based service features and are faced with long waiting times and other inconveniences, due to the associated inefficiencies.

DETAILED DESCRIPTION

Figure 1:
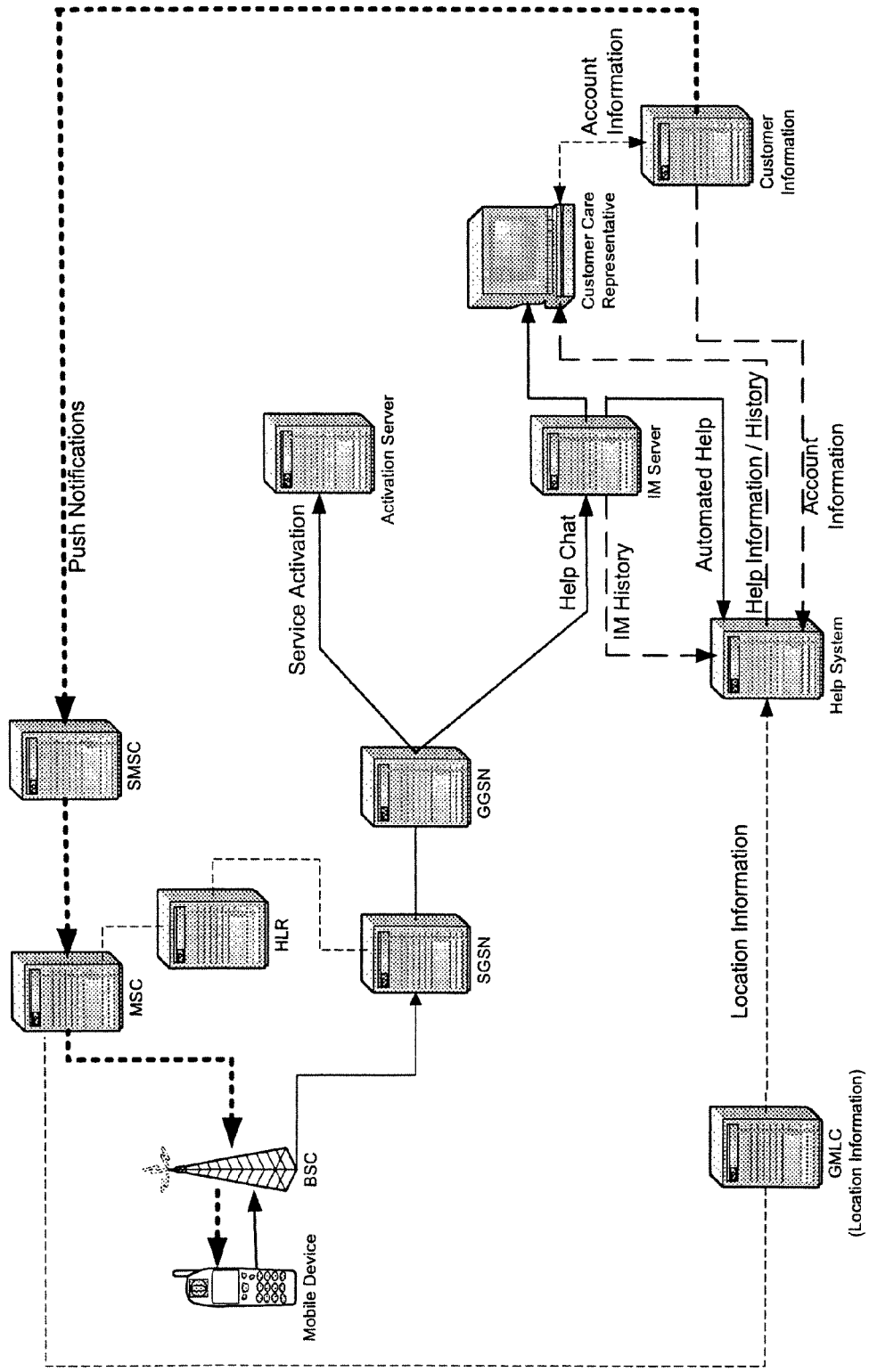
FIG. 1 is a block diagram showing an example of a system for customer service messaging for a mobile device in one embodiment.

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

It is intended that the terminology used in the description presented be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

I. Overview

A system and method for providing customer services on mobile devices using instant messaging (IM) or similar techniques are described herein. Via the mobile device, the user may access one or more IM help entities that provide customer service on demand or upon the occurrence of some predetermined event. In some embodiments, the user may access an IM help entity from a collection or list of IM help entities. In such cases, the user may be able to access the list of IM help entities from an easily accessed screen on the mobile device. In this way, the user does not have to go to a special web site to access the IM help entities, which can be difficult on a mobile typical device, given its compact nature.

To facilitate the use of IM help entities, the mobile device may be configured with instant messaging middleware, or other applications that facilitate instant message-type communications from the mobile device. The IM middleware can be an aftermarket feature, or embedded in the device at manufacturing time. The available IM capabilities can vary depending on the device type, the communications network, the device's current location, the user's service plan subscription, etc.

The instant messages themselves may be of various types, including SMS (short message service) messages, MMS (multimedia message service) messages, WAP push messages, proprietary messages (e.g., Wireless Village™, AOL™, Yahoo!™, ICQ™, MSN™) etc. In some embodiments, a user exchanges messages with a live customer service associate. However, in other embodiments, the IM help entity is an automated feature capable of transferring to a live person on an as-needed basis. For example, a user may begin an IM customer service exchange with an automated IM help entity. When appropriate the automated IM help entity may then hand off to a live IM help entity. Automated IM help entities may use natural language processing. In some embodiments, the user need not have any knowledge of the actual responder, including the responder's name or whether or not the responder is even a human. For example, the user may not be aware when there is a handoff from an automated IM help entity to a live IM help entity.

While the illustrated embodiments describe using the IM scheme for customer service in a wireless context, similar techniques can be implemented in other settings, including entertainment, television, retail sales, etc.

In some embodiments, the IM help entities' activities will change as the mobile device's location changes. For example, both the wireless service provider system and mobile device may be configured with intelligent routing and/or location finding technology. Accordingly, location-based events may trigger activation of one or more IM help entities at the wireless service provider system. In addition, by knowing the location of the device, the IM help entities can provide better service. In some embodiments, the IM help entities may also provide more intelligent customer service based on information about the user's subscription history, subscription service type, mobile equipment, etc.

Users may have the option of adding or removing IM help entities from their "communities" of IM contacts, which can include regular chat buddies, IM help entities, etc. In addition, some IM help entities may be embedded into the device as part of the wireless service, meaning access to such entities is configured into the device by default (e.g., in association with the user's wireless service) and cannot be removed by the user. An example would be an IM help entity that assists a user in activating the mobile device so that it can have increased access to the communication network.

IM help entities can initiate an instant message exchange using alerts. For example, a user may get a message on the screen saying his or her IM help entity would like to initiate a session. Such alerts may be triggered based on many different types of events. In some cases, changes in current location, network/carrier events, account status events, etc., will trigger an alert. In some embodiments, users can, at least to some extent, control the occurrence of such alerts.

In some embodiments, embedded IM help entities allow a user to maintain contact with the wireless service provider so that, even when other services are not available, the user may be able to contact the wireless service provider via the IM help entity. For example, if there is a problem with a subscriber paying his or her wireless services bill, the wireless service may be shut off, with the exception of a billing IM help entity that can assist them in restarting the service (and paying the bill). In another example, an IM help entity can help with activating an otherwise inactive device, such as a device that was just purchased by the user.

With the use of out-of-band messaging, such as SMS, the IM help entity can be automatically invoked without the user selecting it. For example, an IM help entity may alert a user when that user leaves the country, so that the user can use the IM help entity to set up his or her account to support international calling.

Services external to the wireless service provider may also have associated IM help entities (e.g., roadside assistance services, emergency services, bank account, shopping, etc.). In some embodiments, users can add the IM address of any one of a number of IM help entities to an IM help entity list. In this way, the user can easily initiate an IM help entity exchange on the wireless device without having to visit a dedicated web site, etc.

Placing the IM help entities directly on an IM buddy list maximizes the visibility and access to that method of communicating for customer service. This in turn may drive users to perform more of their customer service related interactions via IM and chat channels, thereby reducing the cost of business and improving the customer's experience. These are only some of the advantages that are possible.

II. System Architecture

FIG. 1 and the following discussion provide a brief, general description of a suitable environment in which the invention can be implemented. Although not required, aspects of the invention are described in the general context of computer-executable instructions, such as routines executed by a general-purpose computer (e.g., a server computer, wireless device, or personal/laptop computer). Those skilled in the relevant art will appreciate that the invention can be practiced with other communications, data processing, or computer system configurations, including Internet appliances, hand-held devices (including personal digital assistants (PDAs)), wearable computers, all manner of cellular or mobile phones, embedded computers (including those coupled to vehicles), multi-processor systems, microprocessor-based or programmable consumer electronics, set-top boxes, network PCs, minicomputers, mainframe computers, and the like. Indeed, the terms "computer," "host," and "host computer" are generally used interchangeably and refer to any of the above devices and systems, as well as any data processor.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communication network. In a distributed computing environment, program modules may be located in both local and remote memory storage devices.

Aspects of the invention may be stored or distributed on computer-readable media, including magnetically or optically readable computer disks, as microcode on semiconductor memory, nanotechnology memory, organic or optical memory, or other portable data storage media. Indeed, computer-implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or may be provided on any analog or digital network (packet switched, circuit switched, or other scheme). Those skilled in the relevant art will recognize that portions of the invention reside on a server computer, while corresponding portions reside on a client computer, such as a mobile device.

Referring to FIG. 1, a customer service messaging scheme in one embodiment includes a collection of network components interacting as a system 100. The system 100 of FIG. 1 is an example of a GPRS (general packet radio service) system based on GSM (global system for mobile communication). However, the invention may be implemented on other types of systems, including a variety of communication networks. Examples of wireless telecommunication networks include UMTS (universal mobile telecommunication system), GSM (possibly including GPRS, EDGE (enhanced data rates for GSM evolution), etc.), CDMA (code division multiple access), IS-136, analog, etc. The system 100 may also include various wired or partially wired networks, such as the Internet, a wired LAN (local area network), or even a public switched telephone network (PSTN). While not all types of networks are described here, the invention may be implemented within the framework of many types of networks.

The system 100 includes a mobile device 102 (e.g., mobile phone, PDA, wireless laptop, etc.) in communication with a base station 104 including a base station controller (BSC). As described in more detail in commonly assigned U.S. Patent Application No. 60/590,229, filed Jul. 15, 2004, entitled "Always-On Mobile Instant Messaging of A Messaging Centric Wireless Device" (previously entitled "Always On Mobile IM/Messaging Centric Wireless Device"), the device may also be a messaging-centric wireless device that communicates a message over an "always-on" network. The base station 104 is in communication with a serving GPRS support node (SGSN) 106 and a gateway GPRS support node (GGSN) 108, which together support packet switched transactions. Circuit switched traffic is handled separately by a mobile switching center (MSC) 110. The MSC 110 also serves as an access point for the Public Switched Telephone Network (not shown). In some embodiments, the MSC 110 receives SMS push messages from a short message service center (SMSC) 112.

The SGSN 106 and MSC 110 interact with a home location register 114 (HLR). In some embodiments, the HLR 114 is the primary database of permanent subscriber/customer information for the service provider's mobile network. In the context of activated devices, the HLR 114 may contain pertinent user information, including address information, account status, and preferences.

An activation server 116 facilitates activation of inactive mobile devices so that such devices can have less restricted access to the network of the wireless service provider. The activation server 116 may be associated with its own IM help entity, such as the IM help entity described with respect to FIG. 5, which can be live, automated, or partially automated. An IM server 118 handles all external IM sessions. The IM server 118 may facilitate live, automated, and/or partially automated IM sessions. It may do so in communication with a customer care representative 120, and a help system 122, which provides automated help information and information used by the live customer care representative 120. The help system 122 may also serve as an interface for providing help information to external IM help entities (not shown) when authorized by a user of the mobile device 102. In this way, such external IM help entities, such as the roadside assistance IM help entity described with respect to FIG. 7, may make use of the provided information (e.g., location information) to provide more effective assistance for the user. A customer information component 124 includes account information for use by the system 100 and also facilitates the sending of push notifications to the SMSC 112 so that they may eventually reach the appropriate mobile device.

In some embodiments, the system 100 includes a gateway mobile location center (GMLC) 126 that facilitates the locating of mobile devices. In this way, the location information may be used in providing more effective customer service during IM sessions with IM help entities.

In some embodiments, wireless IM sessions can be implemented using "in-band" and/or "out-of-band" messaging techniques. In-band messaging techniques assume an already-activated IM connection. Out-of-band messaging techniques (e.g., SMS push messages) involve the use of a controlled channel signal, which can be automatically invoked without user initiation. Accordingly, out-of-band messaging techniques may be used for alerts.

The system 100 may use one or more of any of a number of IM protocols, such as Session Initiation Protocol (SIP), SIP for Instant Messaging and Presence Leveraging Extensions (SIMPLE), Extensive Messaging and Presence Protocol (XMPP), and the Open Mobile Alliance's Wireless Village specifications.

Figure 2:
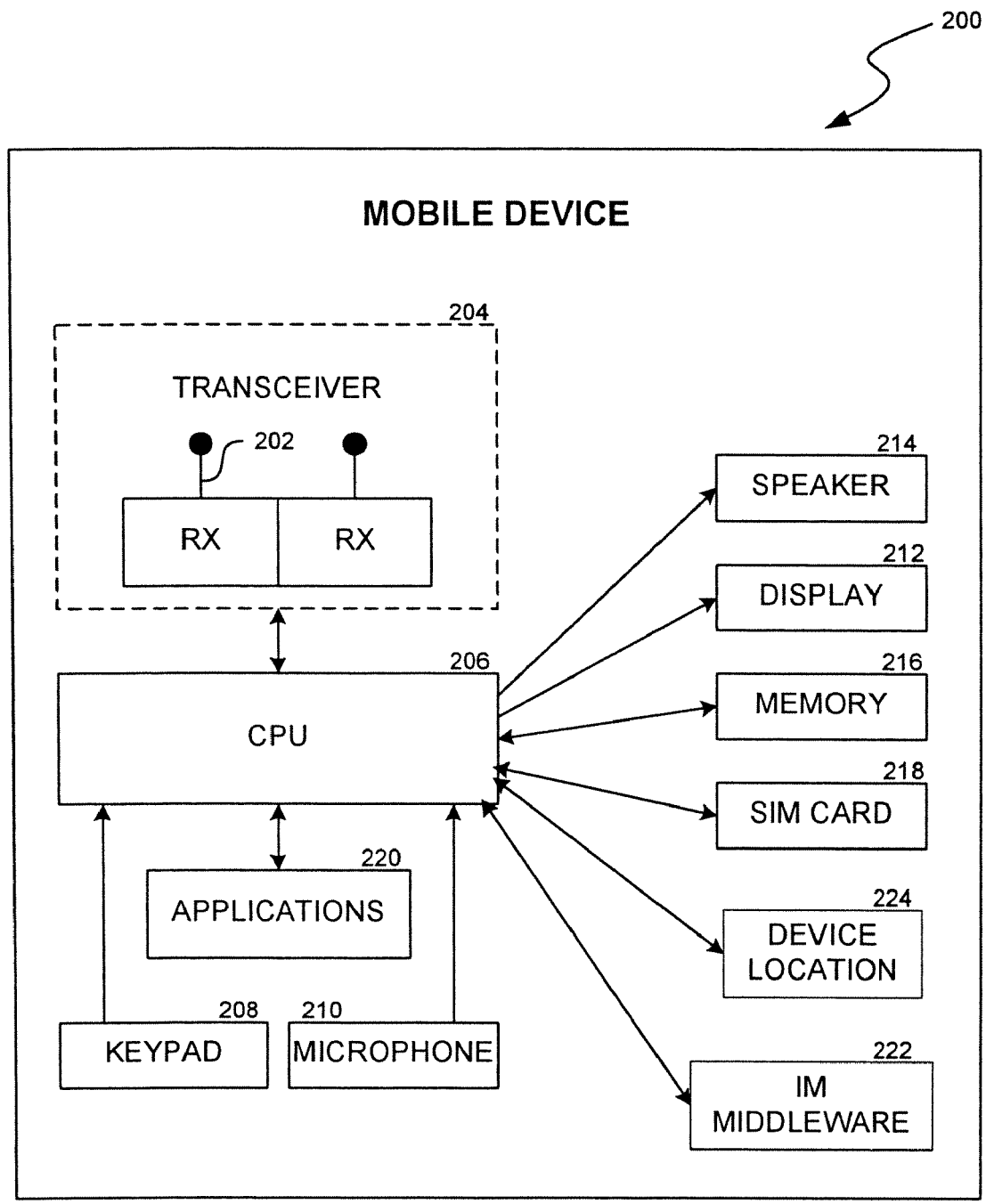
FIG. 2 is a block diagram showing an example implementation of the mobile device of FIG. 1.

FIG. 2 shows a block diagram of a typical mobile communication device 200, such as a mobile handset. While a mobile phone is shown as the mobile communication device in FIG. 1, those skilled in the relevant art will appreciate that the invention can be practiced with other devices and configurations, including Internet appliances, hand-held devices, wearable computers, multi-processor systems, microprocessor-based or programmable consumer electronics, set-top boxes, PDAs, portable laptop computers, and the like. The term "mobile device" is intended to include all such devices.

The mobile device 200 has one or more internal or external antennas 202 for receiving and transmitting electromagnetic signals such as radio frequency signals. A transceiver 204 is connected to the antenna(s) 202 and typically provides modulation and demodulation of the transmitted and received signals, respectively. A processor unit 206 connected to the transceiver 204 may comprise a signal processor, microprocessor, ASIC, or other control and processing logic circuitry. The processor unit 206 may perform signal coding, data processing, input/output processing, power control, and other functions necessary for implementing a mobile communication device. A customer may provide input to the processor unit 206 via a keypad 208, microphone 210, or display/touchpad 212. In turn, the processor unit 206 may provide information to the customer via the display/touchpad 212 or a speaker 214.

The processor unit 206 may access information from, and store information in, a nonremovable memory 216 or a removable memory 218. The nonremovable memory 216 may consist of RAM, ROM, a hard disk, or other well-known memory storage technologies. The removable memory 218 may consist of Subscriber Identity Module (SIM) cards, which are well known in GSM communication systems, or other well-known memory storage technologies, such as "smart cards." Applications 220, including instant messaging applications, wireless content browser applications, and address book applications, could be implemented in either the removable memory 218 or the nonremovable memory 216.

The IM help entity is facilitated in a wireless environment by the inclusion of an instant messaging middleware 222 and/or applications related to an aggregator service on the mobile device. In some embodiments, the middleware 222 allows various aspects of IM help entity persistence, such as the automatic addition of that IM entity to the user's IM buddy list. In some embodiments, the middleware element 222 is also useful in passing various authentication credentials to the responder. If included, the aggregator service allows for translation of different instant messaging protocols, so that the user can work with more than one type of instant message, without having to install complete software packages or middleware on the device for each type instant messaging type.

In some embodiments, a device location component 224 allows the location of the device to be known to the wireless service provider, so that the wireless service provider can use this information (or pass it along) for the purpose of IM help entity interactions and alerts.

Unless described otherwise below, aspects of the invention may be practiced with conventional systems. Thus, the construction and operation of the various blocks shown in FIGS. 1 and 2 may be of conventional design, and need not be described in further detail herein to make and use the invention, because such blocks will be understood by those skilled in the relevant art. One skilled in the relevant art can readily make any modifications necessary to the blocks in FIGS. 1-2 (or other embodiments or Figures) based on the detailed description provided herein.

III. Instant Messaging Help Entity Screens

Various user screens, views, and other interfaces allow users to exchange information with one or more IM help entities. Examples of such screens are described with respect to FIGS. 3 through 7. Additional examples are provided in commonly-assigned U.S. Patent Application No. 60/585,965, filed Jul. 15, 2004, entitled "System and Method for Data Organization and Display in an Instant-Messaging Interface" (previously entitled "IM Community Aggregation"). While only certain examples are given, a person skilled in the art will appreciate that many other interfaces could be implemented without departing from the scope of the invention. The terms "screen," "window," and "page" are generally used interchangeably herein. The pages described herein may be implemented using, for example, SMS, WML (wireless markup language), XHTML (extensible hypertext markup language), XML (extensible markup language), or HTML (hypertext markup language). In some embodiments, WML and XHTML decks offer similar functionality but may differ with respect to style guide and design requirements of the two languages (use of color, icons, etc.). The look and feel of WML pages are primarily text-based, with underlining used to highlight clickable links. XHTML is a richer development language, allowing the mobile device to present content that may stand out on many different levels. For example, XHTML may allow the use of front and background colors, bolding, and icons.

The screens or web pages provide facilities to receive input data, such as a form with fields to be filled in, pull-down menus or entries allowing one or more of several options to be selected, buttons, sliders, hypertext links or other known user interface tools for receiving user input. While certain ways of displaying information to users is shown and described with respect to certain Figures, those skilled in the relevant art will recognize that various other alternatives may be employed. The pages or screens are stored and/or transmitted as display descriptions, as graphical user interfaces, or by other methods of depicting information on a screen (whether personal computer, PDA, mobile telephone or other) where the layout and information or content to be displayed on the page is stored in memory, database, or other storage facility.

When implemented as web pages or wireless content, the screens are stored as display descriptions, graphical user interfaces, or other methods of depicting information on a computer screen (e.g., commands, links, fonts, colors, layout, sizes and relative positions, and the like), where the layout and information or content to be displayed on the page is stored in a database. In general, a "link" refers to any resource locator identifying a resource on a network, such as a display description provided by an organization having a site or node on the network. A "display description," as generally used herein, refers to any method of automatically displaying information on a computer or mobile device screen in any of the above-noted formats, as well as other formats, such as email or character/code-based formats, algorithm-based formats (e.g., vector-generated), or matrix or bit-mapped formats. While aspects of the invention are described herein using a networked environment, some or all features may be implemented within a single-computer environment.

In general, for ease in describing features of the invention, aspects of the invention will now be described in terms of a user interacting with one or more IM help entities via his or her user computer or mobile device. As implemented, however, the user computer receives data input by the user and transmits such input data to the server computer. The server computer then queries the database, retrieves requested pages, performs computations and/or provides output data back to the user computer, typically for visual display to the user.

Figure 3:
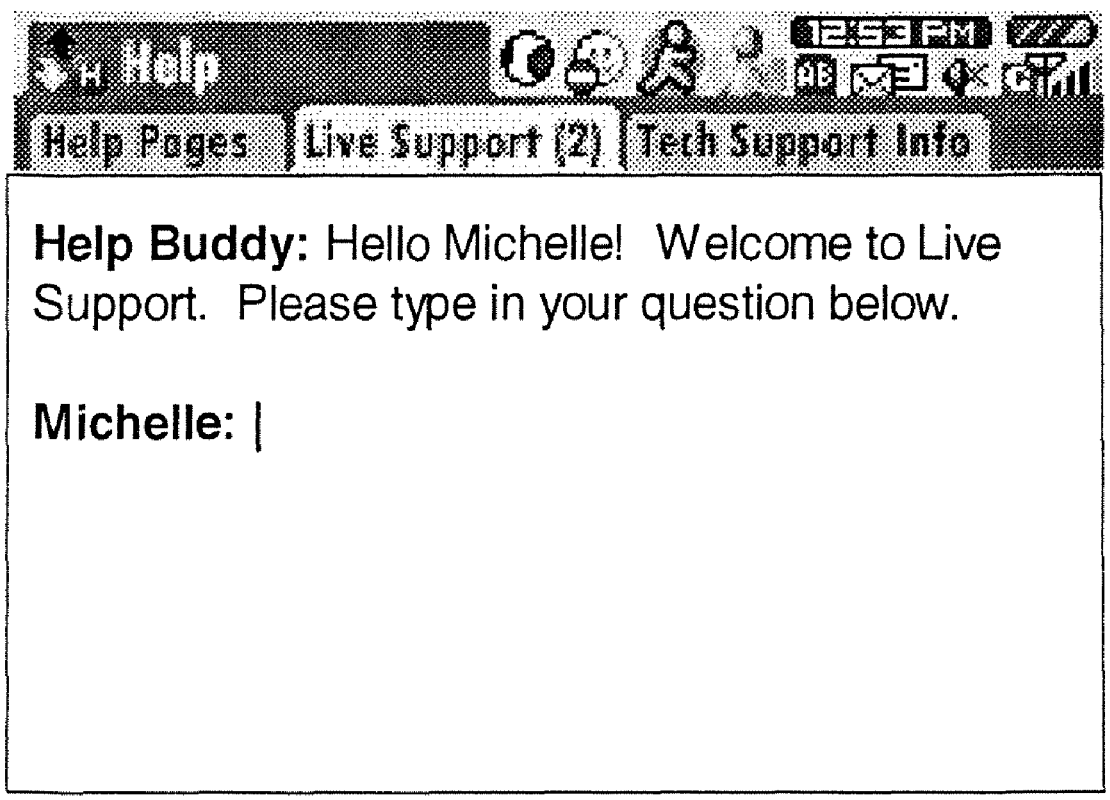
FIG. 3 is a display diagram showing a screen displaying access to an IM help entity for mobile device support in one embodiment.

Referring to FIG. 3, a screen 300 illustrating an example of a session with a live support IM help entity is shown. In the illustrated embodiment, the live support IM help entity is a default IM help entity, meaning it is accessible on the mobile device by default as part of the wireless service and cannot be added or removed by the user.

In the illustrated embodiment, the IM help entity provides technical support relating to the mobile device or the mobile device service. It can be accessed from a help module under a live support tab 302. When the user selects the live support tab 302, the screen 300 appears with a welcome message 304 from the IM help entity, showing that the IM help entity is available. The live support IM help entity welcomes the user (e.g., "Michelle") and asks the user to type in her question below. The user is then presented with a cursor 306 or other indicator, so that she may type her question.

The help module in the illustrated embodiment of FIG. 3 includes other available tabs, including a help pages tab 308 and a tech support info tab 310. These tabs may or may not be associated with the instant message technique for customer service. In some embodiments, information from these tabs (308 and 310) may be referenced by the IM help entity. For example, the IM help entity may be able to control the display of information from these tabs displayed on the screen 300.

Figure 4:
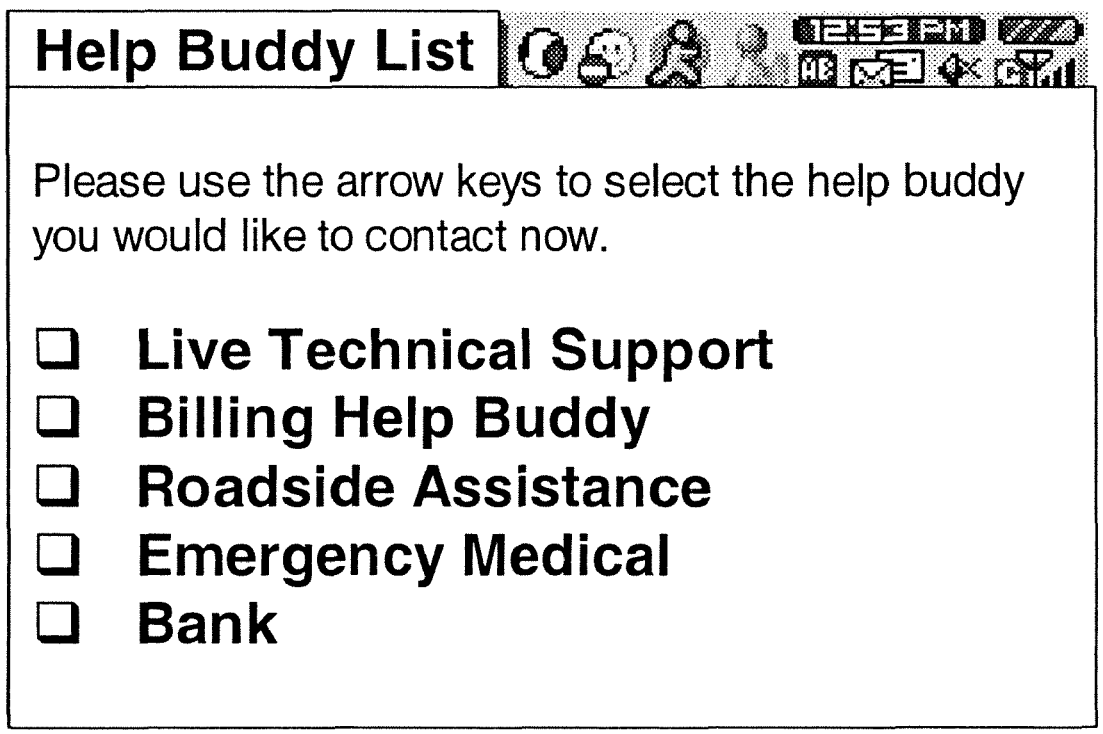
FIG. 4 is a display diagram showing a screen displaying access to a list of IM help entities for customer assistance in one embodiment.

Referring to FIG. 4, a screen 400 shows an example of a help buddy list 401. The help buddy list 401 provides a list of IM help entities that the user may select from if he or she wishes to initiate a conversation with a particular IM help entity. The help buddy list 401 in the illustrated embodiment includes a list of five IM help entities, including a live technical support IM help entity 402, a billing IM help entity 404, a roadside assistance IM help entity 406, an emergency medical IM help entity 408, and a bank IM help entity 410.

The list of IM help entities may be diverse and may include both help entities associated with the wireless service provider and help entities external to the wireless service provider. For example, in the illustrated embodiment, the live technical support IM help entity 402 and the billing IM help entity 404 are associated with the mobile service provider, while the roadside assistance IM help entity 406, the emergency medical IM help entity 408, and the bank IM help entity 410 are associated with external systems.

In some embodiments, the list of help entities may be modified so that the user can have easy access to desired help entities. For example, users of the mobile device may add new help entities and remove or delete existing IM help entities. However, in other embodiments where the wireless service provider has embedded the IM help entity in the device (e.g., live support help entity), removing the help entity from the "buddy" will still permit access of the help entity from another screen (e.g., screen 300 of FIG. 3). In some embodiments, the list of IM help entities may be combined with a list of regular IM contacts (e.g., buddies). In other embodiments, separate lists may be used.

Figure 5:
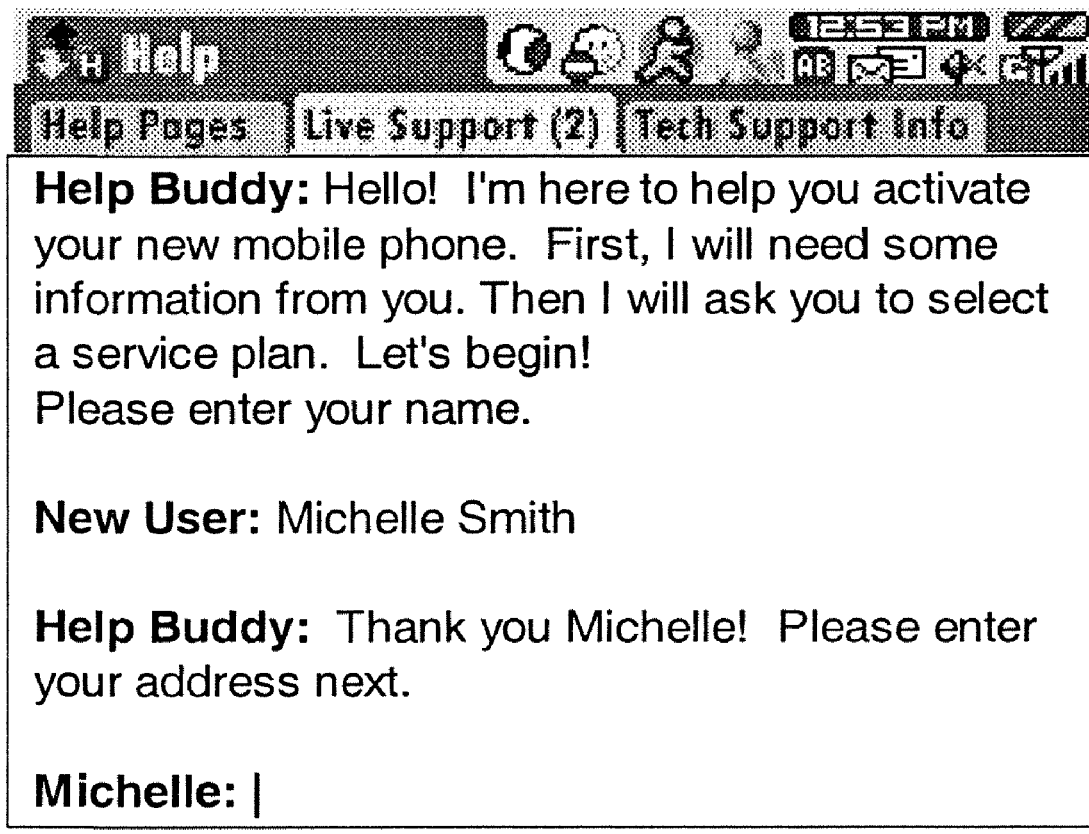
FIG. 5 is a display diagram showing a screen displaying an IM session with an IM help entity for activation of an inactive mobile device.

Referring to FIG. 5, a screen 500 illustrating an example of a session with a device activation IM help entity 502 is shown. Like the live support IM help entity of FIG. 3, the device activation IM help entity 502 of FIG. 5 may be a default (embedded) IM help entity, which is included as part of the wireless service. Accordingly, in some embodiments, it cannot be added or removed by the user. In other embodiments, the device activation IM help entity 502 may become inaccessible to the user once the device is activated. For example, upon activation, the wireless service provider may send a message to the device so that access to the device activation IM help entity 502 is terminated. In another example, the wireless service provider may send a message to the device so that access to the device activation IM help entity 502 is replaced with access to another IM help entity, such as the live service help entity of FIG. 3.

In the illustrated embodiment, the device activation IM help entity 502 may help a user to activate an inactive device (e.g., upon purchase of the device). The screen 500 shows an example of an exchange of messages between the device activation IM help entity 502 and a new user (see new user prompt 504). As shown, the device activation IM help entity 502 welcomes the new user and asks the user to enter personal information. Once the user's name has been entered (e.g., "Michelle Smith") the application is updated to customize the instant messaging by providing the user's name 506 in place of the new user prompt 504. As described in more detail in commonly-assigned U.S. Patent Application No. 60/590,185, filed Jul. 15, 2004, entitled "Dedicated Wireless Device Business Model," the device activation may be based on a wireless device business model that employs functionality to allow a user to select basic account services, select, optional services (e.g., third party portals, usage discounts, volume discounts, etc.), select pre-paid/post-paid payment options, select charging cycle, select billing methods, etc.

Figure 6:
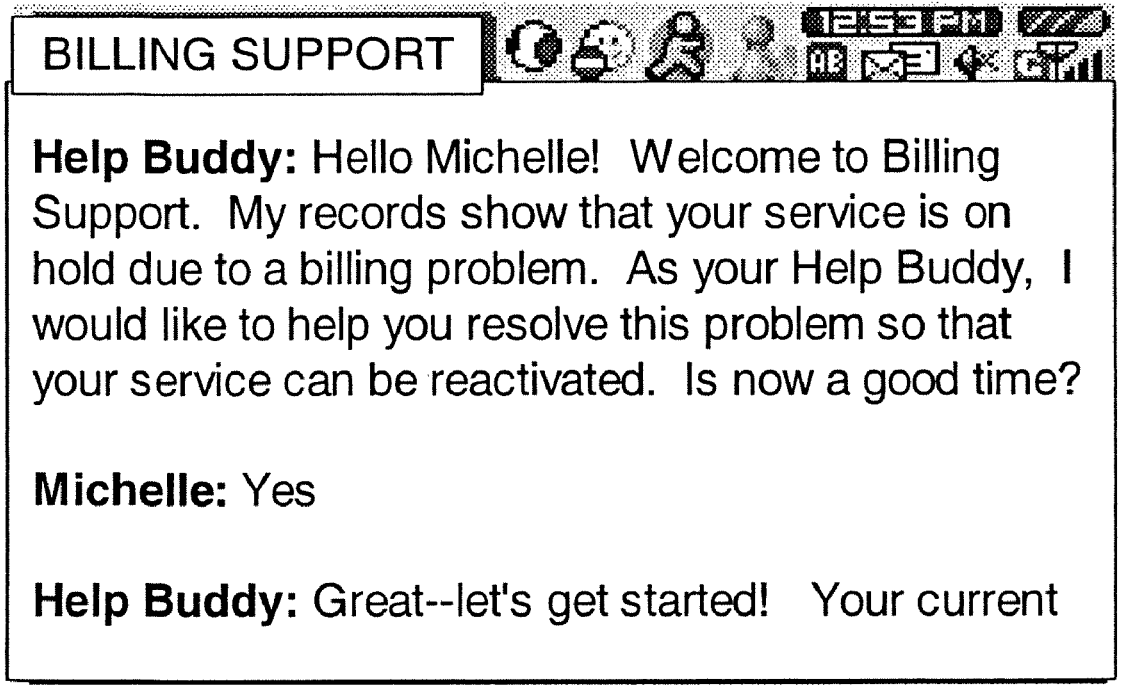
FIG. 6 is a display diagram showing a screen displaying an IM session with an IM help entity for help with a billing problem.

Referring to FIG. 6, a screen 600 illustrating an example of a session with a billing IM help entity 602 is shown. In the illustrated embodiment, the billing help entity is a default IM help entity, meaning that, in some embodiments, it is accessible on the mobile device by default as part of the wireless service and cannot be added or removed by the user. The billing IM help entity 602 of the illustrated embodiment allows a user to resolve billing issues with the mobile service provider. For example, the user may receive an alert from the billing IM help entity 602 upon deactivation of his or her account for failure to pay a service bill. In some embodiments, all other services except for those needed to operate the billing IM help entity 602 may be deactivated. In this way, the user can reactivate the account with the help of the billing IM help entity 602 (e.g., provide credit card information, etc.) so access to the deactivated services can be restored. Commonly-assigned U.S. Patent Application No. 60/590,185, filed Jul. 15, 2004, entitled "Dedicated Wireless Device Business Model" provides additional details relating to suspending and resuming post-paid services. Other examples of issues handled by the billing IM help entity include disputing service charges, account analysis, and signing upgrading to or discontinuing select services.

Figure 7:
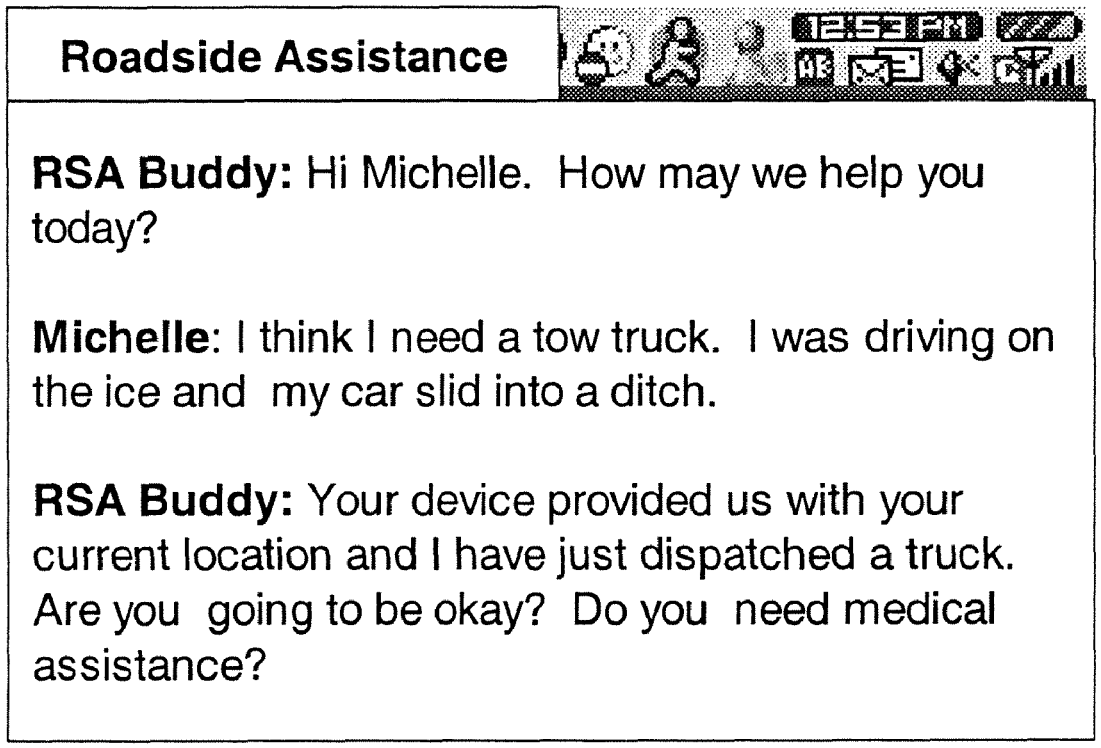
FIG. 7 is a display diagram showing a screen displaying an IM session with an IM help entity for emergency roadside assistance.

Referring to FIG. 7, a screen 700 illustrating an example of a session with a roadside service IM help entity 702 is shown. In the illustrated embodiment, the roadside service IM help entity 702 is a non-default and external IM help entity, meaning it can be added or removed by the user. In the message transactions of screen 700, the user ("Michelle") 704 requests a tow truck and the wireless service provider automatically provides the roadside assistance IM help entity with information regarding the user's current location, so that the user does not need to provide such information. In some embodiments, this is made possible via device location technology installed in the mobile device and the wireless service provider system. In some cases, the user may be able to control the information that may be passed on to the external IM help entity.

IV. System Flows

Figure 8:
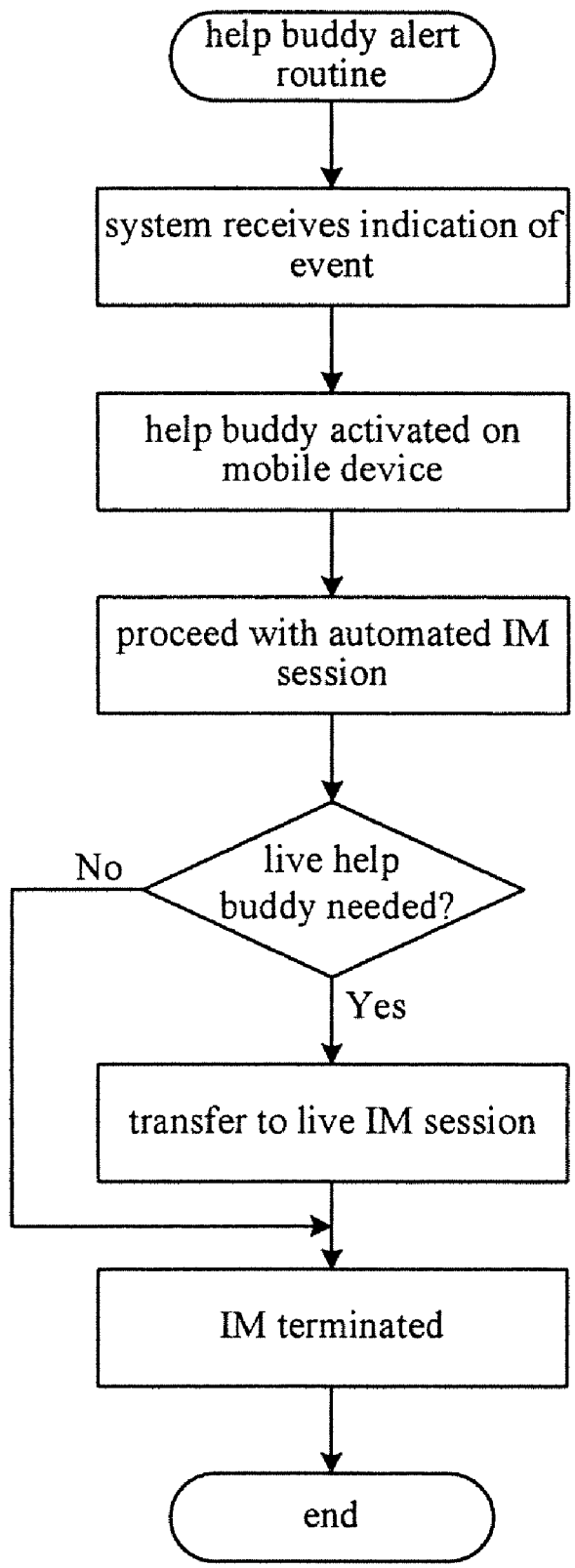
FIG. 8 is a flow diagram showing a routine for an IM session initiated by an alert received at the mobile device.
Figure 9:
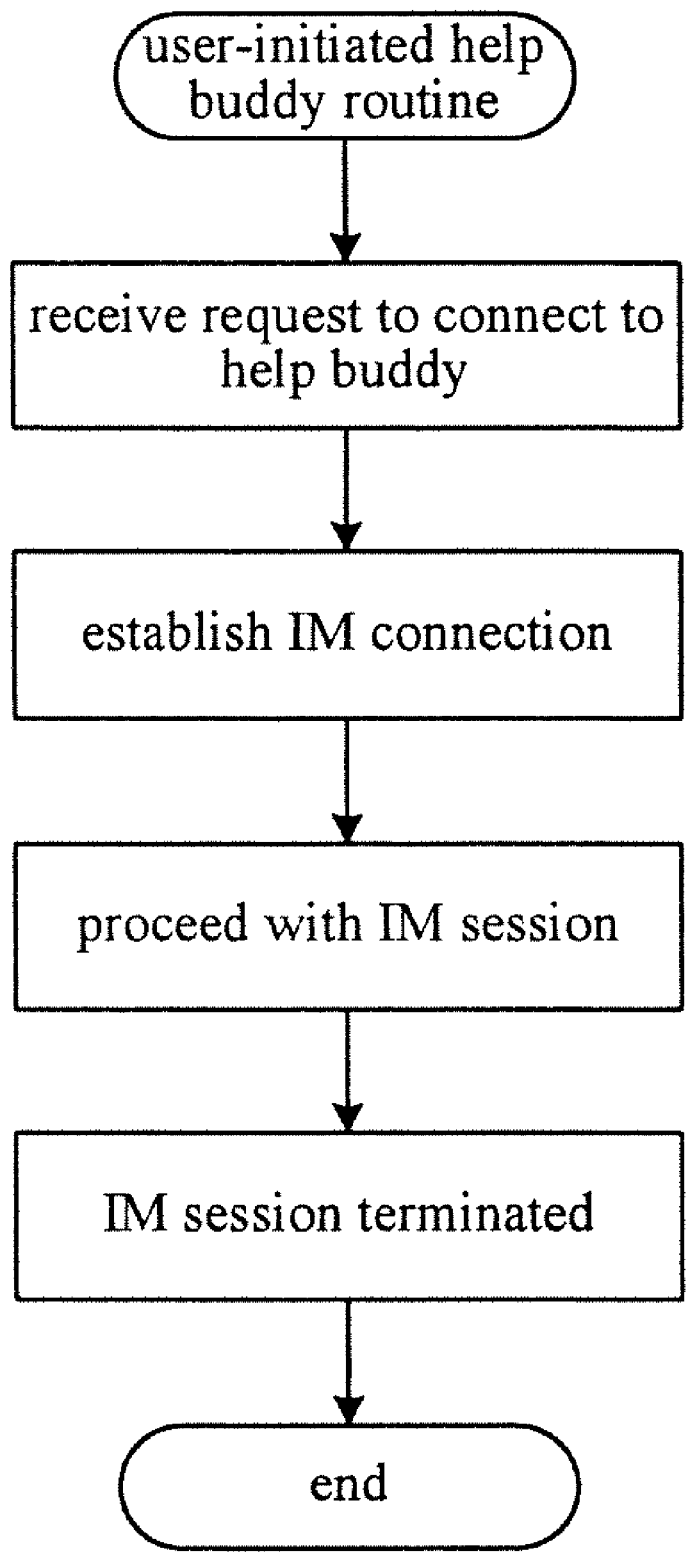
FIG. 9 is a flow diagram showing a routine for an IM session initiated by the user from the mobile device.

FIGS. 8 and 9 are representative flow diagrams that show processes that occur within the system 100 of FIG. 1. These flow diagrams do not show all functions or exchanges of data but, instead, provide an understanding of commands and data exchanged under the system. Those skilled in the relevant art will recognize that some functions or exchanges of commands and data may be repeated, varied, omitted, or supplemented, and other aspects not shown may be readily implemented. For example, while not described in detail, a message containing data may be transmitted through a message queue, over HTTP, etc.

Referring to FIG. 8, a routine 800 for an IM session initiated via an IM help entity alert message is shown. At block 801, the service provider system receives an indication of an event occurring that would trigger an alert by the IM help entity. Examples of triggering events include user location based events (e.g., going into a location where the user needs to sign up for extended services, entering a roaming area, entering an area where enhanced network services are available, etc.), changes being made to the user's current account status, etc. Several examples of \Upon receipt of an indication of an event occurring, the IM help entity is activated on the mobile device at block 802. For example, the system may send a push message to the device of the user. The user may receive this message in the form of an alert. An audible alert may be sounded to alert the user, or some other technique for alerting the user may be used, such as a flashing or a graphical display.

At block 803, upon acceptance by the user, the routine 800 proceeds with an automated IM help entity session. In some embodiments, this step may be skipped, and the routine 800 may proceed directly with a live IM help entity at the other end (block 805). At decision block 804, the automated IM help entity determines whether the session should be passed to a live IM help entity. If a live IM help entity is needed, the routine 800 proceeds to block 805. However, if at decision block 804 a live IM help entity is not needed, the routine 800 eventually proceeds to block 806 where the instant messaging session is terminated.

At block 805, upon transfer to a live IM help entity, the routine 800 continues until the instant messaging session is terminated by either the user or the IM help entity (block 806). The routine then ends.

Referring to FIG. 9, a routine 900 for a user-initiated IM help entity session begins at block 901, where the system receives a user request to connect the user to an IM help entity. At block 902, the system establishes an instant messaging connection that allows the user to communicate directly with the IM help entity. For example, an in-band messaging scenario may be initiated. As described in more detail above, the IM help entity may be a live IM help entity or an automated IM help entity, or a combination of both. At block 903, the routine proceeds with the IM session, resulting in an exchange of messages. At block 904, the IM session is terminated and the routine ends.

V. Conclusion

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times. Where the context permits, words in the above Detailed Description using the singular or plural number may also include the plural or singular number, respectively, where the context permits.

The teachings of the invention provided herein can be applied to other systems, not necessarily the system described herein. The elements and acts of the various embodiments described above can be combined to provide further embodiments.

This application is related to the following commonly assigned U.S. Patent Applications: U.S. Patent Application No. 60/587,792, filed Jul. 15, 2004, entitled "Selection of Bearer Mode According to Message Characteristics" (previously entitled "Smart Compose for Wireless Devices"), U.S. Patent Application No. 60/588,018, filed Jul. 15, 2004, entitled "Maintaining Instant Message Session Status in Dynamic Operating Environment" (previously entitled "Automated IM Status Changing"), U.S. Patent Application No. 60/585,965, filed Jul. 15, 2004, entitled "System and Method for Data Organization and Display in an Instant-Messaging Interface" (previously entitled "IM Community Aggregation"), U.S. Patent Application No. 60/590,185, filed Jul. 15, 2004, entitled "Dedicated Wireless Device Business Model," U.S. Patent Application No. 60/590,229, filed Jul. 15, 2004, entitled "Always-On Mobile Instant Messaging of A Messaging Centric Wireless Device" (previously entitled "Always On Mobile IM/Messaging Centric Wireless Device"), and U.S. Patent Application No. 60/588,307, filed Jul. 15, 2004, entitled "Using Emoticons, Such As For Wireless Devices," all herein incorporated by Reference. Commonly owned U.S. patent application Ser. No. 10/918,617, filed Aug. 13, 2004, entitled "Wireless Device Service Activation from the Wireless Device Aspects" is also incorporated by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, the invention can be practiced in many ways. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only some aspects of the invention are recited as embodied in a computer-readable medium, other aspects may likewise be embodied in a computer-readable medium. Accordingly, the inventors reserve the right to add additional claims after filing the application to pursue such additional claim forms for other aspects of the invention.

What is claimed:

1. A system for providing help to users of mobile phones within a wireless network, the system comprising:
   at least one mobile phone associated with a user, wherein the mobile phone includes:
       user input buttons,
       a display device, and
       a middleware application for providing messaging capabilities,
   wherein the mobile phone is configured to display on the display device at least two messaging help addresses associated with help services for providing help to the user by way of messaging transactions, and
   wherein at least one of the messaging help addresses is automatically or initially added to a list of messaging addresses displayed by the mobile phone and which substantially can not be removed by the user;
   at least one help facility mapped to the at least two messaging help addresses, wherein the help facility comprises an automated help facility and a live operator-assisted help facility, and wherein the help facility is configured to:
       receive a first user-initiated help request message from the mobile phone based on user actuation of the input buttons and selection of one of the displayed messaging help addresses,
       determine an appropriate response based on the received first user-initiated message help request,
       provide at least one help response message for display on the mobile phone to assist the user,
       receive a second user-initiated help request message from the mobile phone based on user actuation of the input buttons,
       determine, based on the second user-initiated help request message, whether to route the first user-initiated help request message to a live operator-assisted help facility, and
       route the first user-initiated help request message to a live operator-assisted help facility; and
   at least one telecommunications server coupled to the mobile phone and the help facility by way of the wireless network, wherein the telecommunications server includes a messaging facility for facilitating communication between the mobile phone and the help facility.

2. The system of claim 1, wherein one of the messaging help addresses is associated with assistance in initial wireless service activation, wherein the first user-initiated help request message comprises a request for assistance in activating a wireless service account for the mobile phone, and wherein the help facility is configured to:
   automatically determine, based on the second user-initiated help request message, whether to route the first user-initiated help request message to a live operator-assisted help facility associated with assistance in initial wireless service activation.

3. The system of claim 1, wherein one of the messaging help addresses is associated with assistance in wireless service billing, wherein the first user-initiated help request message comprises a request for assistance in wireless service billing, and wherein the help facility is configured to:

automatically determine, based on the second user-initiated help request message, whether to route the first user-initiated help request message to a live operator-assisted help facility associated with assistance in wireless service billing.

4. The system of claim 1, wherein one of the messaging help addresses is associated with wireless service technical support, wherein the first user-initiated help request message comprises a request for wireless service technical support, and wherein the help facility is configured to:
automatically determine, based on the second user-initiated help request message, whether to route the first user-initiated help request message to a live operator-assisted help facility associated with wireless service technical support.

5. The system of claim 1, wherein the help facility determines whether to route the first user-initiated help request message to either the automated help facility or live operator-assisted help facility based on at least one of: identity of the user, type of wireless account associated with the mobile phone, recent mobile phone activity, business history associated with the mobile phone or user, or whether a state of service associated with the mobile phone is active, suspended, or not yet active.

6. The system of claim 1 wherein the help facility is further configured to automatically provide a message to the mobile phone upon the occurrence of a predetermined event, wherein the predetermined event includes a location of the mobile phone, a status of a wireless service account associated with the mobile phone, a current wireless network communicating with the mobile phone, or a recent messaging registration of another user within the wireless network.

7. The system of claim 1 wherein the mobile phone or wireless network provides global positioning system or other position locating technology to determine a location of the mobile phone, wherein one of the at least two messaging help addresses is associated with roadside assistance, wherein the at least one help facility is a roadside assistance service in communication with the wireless network and the telecommunications server, and wherein the roadside assistance service help facility receives the determined location of the mobile phone and provides messaging help to the user via the mobile phone.

8. A method of providing help to users of mobile phones within a wireless network, the method comprising:
providing at least one help facility mapped to at least two messaging help addresses on at least one mobile phone, wherein the help facility comprises an automated help facility and a live operator-assisted help facility, wherein the mobile phone is associated with a user,
wherein the mobile phone comprises a display device and a middleware application for providing messaging capabilities,
wherein the mobile phone is configured to display on the display device at least two messaging help addresses associated with help services for providing help to the user by way of messaging transactions, and
wherein at least one of the messaging help addresses is automatically or initially added to a list of messaging addresses displayed by the mobile phone and which substantially can not be removed by the user;
receiving, at the help facility, a first user-initiated help request message from the mobile phone based on user selection of one of the displayed messaging help addresses;
determining an appropriate response based on the received first user-initiated help request message;
sending at least one help response message to the mobile phone to assist the user;
receiving, at the help facility, a second user-initiated help request message from the mobile phone;
determining, based on the second user-initiated help request message, whether to route the first user-initiated help request message to a live operator-assisted help facility; and
routing the first user-initiated help request message to a live operator-assisted help facility.

9. The method of claim 8, wherein one of the messaging help addresses is associated with assistance in initial wireless service activation, and wherein the first user-initiated help request message comprises a request for assistance in activating a wireless service account for the mobile phone, further comprising:
automatically determining, based on the second user-initiated help request message, whether to route the first user-initiated help request message to a live operator-assisted help facility associated with assistance in initial wireless service activation.

10. The method of claim 8, wherein one of the messaging help addresses is associated with assistance in wireless service billing, and wherein the first user-initiated help request message comprises a request for assistance in wireless service billing, further comprising:
automatically determining, based on the second user-initiated help request message, whether to route the first user-initiated help request message to a live operator-assisted help facility associated with assistance in wireless service billing.

11. The method of claim 8, wherein one of the messaging help addresses is associated with wireless service technical support, and wherein the first user-initiated help request message comprises a request for wireless service technical support, further comprising:
automatically determining, based on the second user-initiated help request message, whether to route the first user-initiated help request message to a live operator-assisted help facility associated with wireless service technical support.

12. The method of claim 8, further comprising determining whether to route the received user-initiated message help request to either the automated help facility or live operator-assisted help facility based on at least one of: identity of the user, type of wireless account associated with the mobile phone, recent mobile phone activity, business history associated with the mobile phone or user, or whether a state of service associated with the mobile phone is active, suspended, or not yet active.

13. The method of claim 8, further comprising automatically providing a message to the mobile phone upon the occurrence of a predetermined event, wherein the predetermined event includes a location of the mobile phone, a status of a wireless service account associated with the mobile phone, a current wireless network communicating with the mobile phone, or a recent messaging registration of another user within the wireless network.

14. The method of claim 8, wherein the mobile phone or wireless network provides global positioning system or other position locating technology to determine a location of the mobile phone, wherein one of the at least two messaging help addresses is associated with roadside assistance, and wherein the at least one help facility is a roadside assistance service external to the wireless network and the telecommunications server, further comprising receiving, at the roadside assistance service help facility, the determined location of the mobile phone and sending messaging help to the mobile phone.

15. A non-transitory computer-readable medium comprising computer-readable instructions for providing help to users of mobile phones within a wireless network, the computer-readable instructions comprising instructions for:
provided at least one help facility mapped to at least two messaging help addresses on at least one mobile phone, wherein the help facility comprises an automated help facility and a live operator-assisted help facility,
wherein the mobile phone is associated with a user,
wherein the mobile phone comprises a display device and a middleware application for providing messaging capabilities,
wherein the mobile phone is configured to display on the display device at least two messaging help addresses associated with help services for providing help to the user by way of messaging transactions, and
wherein at least one of the messaging help addresses is automatically or initially added to a list of messaging addresses displayed by the mobile phone and which substantially can not be removed by the user;
receiving, at the help facility, a first user-initiated help request message from the mobile phone based on user selection of one of the displayed messaging help addresses;
determining an appropriate response based on the received first user-initiated help request message;
sending at least one help response message to the mobile phone to assist the user;
receiving, at the help facility, a second user-initiated help request message from the mobile phone;
determining, based on the second user-initiated help request message, whether to route the first user-initiated help request message to a live operator-assisted help facility; and
routing the first user-initiated help request message to a live operator-assisted help facility.

16. The non-transitory computer-readable medium of claim 15, wherein one of the messaging help addresses is associated with assistance in initial wireless service activation, and wherein the first user-initiated help request message comprises a request for assistance in activating a wireless service account for the mobile phone, further comprising instructions for:
automatically determining, based on the second user-initiated help request message, whether to route the first user-initiated help request message to a live operator-assisted help facility associated with assistance in initial wireless service activation.

17. The non-transitory computer-readable medium of claim 15, wherein one of the messaging help addresses is associated with assistance in wireless service billing, and wherein the first user-initiated help request message comprises a request for assistance in wireless service billing, further comprising instructions for:
automatically determining, based on the second user-initiated help request message, whether to route the first user-initiated help request message to a live operator-assisted help facility associated with wireless service billing.

18. The non-transitory computer-readable medium of claim 15, wherein one of the messaging help addresses is associated with wireless service technical support, and wherein the first user-initiated help request message comprises a request for wireless service technical support, further comprising instructions for:
automatically determining, based on the second user-initiated help request message, whether to route the first user-initiated help request message to a live operator-assisted help facility associated with wireless service technical support.

19. The non-transitory computer-readable medium of claim 15, further comprising instructions for determining whether to route the received user-initiated message help request to either the automated help facility or live operator-assisted help facility based on at least one of: identity of the user, type of wireless account associated with the mobile phone, recent mobile phone activity, business history associated with the mobile phone or user, or whether a state of service associated with the mobile phone is active, suspended, or not yet active.

20. The non-transitory computer-readable medium of claim 15, further comprising instructions for automatically providing a message to the mobile phone upon the occurrence of a predetermined event, wherein the predetermined event includes a location of the mobile phone, a status of a wireless service account associated with the mobile phone, a current wireless network communicating with the mobile phone, or a recent messaging registration of another user within the wireless network.

21. The non-transitory computer-readable medium of claim 15, wherein the mobile phone or wireless network provides global positioning system or other position locating technology to determine a location of the mobile phone, wherein one of the at least two messaging help addresses is associated with roadside assistance, and wherein the at least one help facility is a roadside assistance service external to the wireless network and the telecommunications server, further comprising instructions for receiving, at the roadside assistance service help facility, the determined location of the mobile phone and sending messaging help to the mobile phone.

* * * * *